United States Patent Office 2,995,594
Patented Aug. 8, 1961

2,995,594
PROCESS FOR MAKING PHOSPHORUS-CONTAINING SILICON COMPOUNDS
Frank Fekete, Verona, Pa., assignor to Union Carbide Corporation, a corporation of New York
No Drawing. Filed Dec. 23, 1958, Ser. No. 782,375
6 Claims. (Cl. 260—448.8)

This invention is directed to a novel process for preparing organo-silicon compounds containing combined silicon and phosphorus and to novel compounds prepared thereby.

My novel process in its broadest sense involves the addition reaction of a phosphorus compound containing at least one olefinically unsaturated aliphatic or cycloaliphatic group bonded to phosphorus with a silicon compound containing at least one hydrogen atom bonded to silicon in the presence of a di-tertiaryalkyl peroxide. By the term "hydrocarbyl", as used herein, is means a monovalent hydrocarbon group composed of carbon and hydrogen. This addition reaction is represented by the following general equations employing respectively allylethylphenylphosphine, $C_6H_5(C_2H_5)PCH_2CH_2=CH_2$ and diethyl allylphosphonate

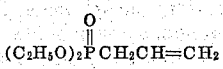

as the phosphorus compounds:

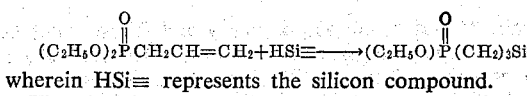

wherein HSi≡ represents the silicon compound.

The phosphorus compounds employed as starting materials in my process are those containing one trivalent or quinquevalent phosphorus atom to which is bonded at least one olefinically unsaturated aliphatic or cycloaliphatic group and the remaining unfilled valences of which are satisfied by not more than one oxo group and/or by no other members than hydrocarbyl and hydrocarbyloxy groups free of aliphatic unsaturation. By the term hydrocarbyloxy group free of aliphatic unsaturation, as employed herein, is meant a monovalent hydrocarbon group which is free of aliphatic unsaturation and is attached to ether oxygen, i.e., R'O— where R' is a hydrocarbyl group free of aliphatic unsaturation.

The silicon compounds employed as starting materials in the process of this invention are the organosilanes and the polyorganosiloxanes and contain at least one silicon atom and at least one silicon bonded hydrogen atom. Each remaining unfilled valence of all silicon atoms is satisfied by no other group than hydroxy, alkoxy and hydrocarbyl groups free of aliphatic unsaturation and by no other atoms than carbon of a hydrocarbyl group free of aliphatic unsaturation and oxygen which is bonded to no other atoms than hydrogen, silicon and carbon of an alkyl group.

My process is carried out by bringing the silicon compound and phosphorus compound into reactive contact in the presence of a di-tertiary-alkyl peroxide catalyst. Mole ratios of phosphorus compound and silicon compound employed as starting materials in the process are not narrowly critical. Stoichiometric amounts, as illustrated by the above general equations, are preferred for an efficient reaction and ease of product recovery. For example, one mole of silicon-bonded hydrogen is preferred for each olefinically unsaturated aliphatic or cycloaliphatic group bonded to phosphorus. Thus, if it is desired to add one molecule of a silicon compound having two silicon-bonded hydrogens per molecule to two molecules of a phosphorus compound having only one phosphorus-bonded, olefinically unsaturated aliphatic or cycloaliphatic group per molecule a mole ratio of about two moles of phosphorus compound to one mole of silicon compound is preferably employed. Similarly, a mole ratio of one mole of phosphorus compound to one mole of silicon compound is preferably employed if it is desired to add one molecule of the phosphorus compound to one molecule of the silicon compound. When employing a silicon compound having two silicon-bonded hydrogens per molecule and a phosphorus compound having one phosphorus-bonded, olefinically unsaturated aliphatic or cycloaliphatic group per molecule in my process, a mole ratio of one mole of phosphorus compound per mole of silicon compound is preferred, if it is desired to add one silicon compound molecule to one phosphorus compound molecule, and a mole ratio of two moles of silicon compound per mole of phosphorus compound is preferred, if it is desired to add two molecules of the silicon compound to one molecule of the phosphorus compound. Other than stoichiometric amounts of the starting materials also can be used without, however, any commensurate advantage.

The temperature at which my process is conducted is not narrowly critical and can be varied in accordance with the speed of reaction desired. Temperatures of about 100° C. to 250° C. are advantageously employed and provide a smooth reaction and high yields of products. Temperatures below about 100° C. can be used if desired but the rate of reaction is slower than at higher temperatures. The process can be conducted also at temperatures above 250° C., but lower yields due to side reactions are more imminent. Superatmospheric pressures are advantageously employed to aid the reaction and improve yields, although atmospheric pressures can be employed also. Sub-atmospheric pressures are not necessary and no advantage is obtained by the use thereof. The process can be conducted at whatever pressures exist in the particular reaction vessel employed without purposely applying increased or reduced pressures. Solvents are not required although they can be employed to simplify the handling of the reaction mixture.

A di-tertiaryalkyl peroxide catalyst is essential in carrying out my process. Illustrative of di-tertiaryalkyl peroxides are di-tertiarybutyl peroxide, t-butyl-t-triptyl peroxide, t-butyltriethylmethyl peroxide, t-butyl perbenzoate, and the like. Di-tertiaryalkyl peroxides having from 4 to 11 carbon atoms in each tertiaryalkyl group thereof are particularly effective and thus are preferred. Amounts of di-tertiaryalkyl peroxides which are employed in the process are those in the range from about 3 percent to about 25 percent by weight based on the weight of phosphorus compound starting material. Greater and smaller amounts of di-tertiaryalkyl peroxide can be employed although no commensurate advantage is seen to be gained.

The product is isolated by any suitable procedure many of which are commonly employed by persons skilled in the art. For example, the distillable products, i.e., in general the silanes, are most readily isolated and purified by fractional distillation. The high boiling products, i.e., in general the siloxanes, are most readily isolated by removing foreign material, e.g., unreacted starting materials and by-products; by distillation, washing with solvents or filtering or any combination of these procedures. Other isolation procedures commonly employed by skilled chemists, e.g., recrystallization procedures for solid crystalline products, can also be used for isolating the products disclosed herein.

Phosphorus compounds which are employed as starting materials in my process include trivalent phosphorus compounds which contain one trivalent phosphorus atom and at least one phosphorus-bonded, olefinically unsaturated aliphatic or cycloaliphatic group, each remaining unfilled valence of phosphorus being satisfied by a hydrocarbyl group, free of aliphatic unsaturation or a hydrocarbyloxy group, free of aliphatic unsaturation. Also employed as starting materials are quinquevalent phosphorus compounds which contain one quinquevalent phosphorus atom, one oxo oxygen connected to phosphorus and at least one phosphorus-bonded olefinically unsaturated aliphatic or cycloaliphatic group. Each remaining unfilled valence of the quinquevalent phosphorus atom being satisfied by a hydrocarbyl group free of aliphatic unsaturation or a hydrocarbyloxy group free of aliphatic unsaturation.

The phosphorus compounds are those described above and include the phosphines, phosphinites, phosphonites, phosphine oxides, phosphinates and phosphonates. The Phosphines include those represented by the formula $(R')_{3-m}PR_m$ where R' is as previously defined and need not be the same throughout the same molecule, R is an olefinically unsaturated aliphatic or cycloaliphatic group and m is an integer of 1 or 2. Illustrative of such phosphines are phenyldiallylphosphine, tolyldiallylphosphine, ethyldimethallylphosphine, stearyldioleylphosphine, xylyldimethallylphosphine, (4 - isopropylphenyl)dioleylphosphine, allylethylphenylphosphine, olelydiphenylphosphine, cyclohexenyldiethylphosphine, styryldioctylphosphine and the like. Phosphinites include those having the formula $(R'O)R'_{2-m}PR_m$ where R' is as previously defined and need not be the same throughout the same molecule and R and m are as previously defined. Typical phosphinites are $(C_8H_{17}O)(C_6H_5)PCH_2CH=CH_2$
$(C_4H_9O)(C_6H_5)PCH=CH_2$
$(C_2H_5O)(C_6H_5)PCH_2CH=CH_2$
$(C_2H_5)(C_6H_5O)PCH_2CH=CH_2$
$(C_4H_9O)P(C_6H_5)(CH_2CH=CH_2)$
$(C_6H_5O)P(C_2H_5)(CH_2CH=CH_2)$ and the like.

Phosphonites having the formula: $(R'O)_2PR$ wherein R and R' are as previously defined, are also included in the phosphorus compounds which are employed in my process. Illustrative phosphonites are $(CH_3CHClCH_2O)_2PCH_2CH=CH_2$
$(C_6H_5O)_2PCH_2CH=CH_2$
$(C_8H_{17}O)_2PCH_2CH=CH_2$
$(C_6H_5O)(C_8H_{17}O)PCO_2-CH=CH_2$
$(CH_3CHClCH_2O)_2PCH=CH_2$
$(CH_2=CH-CH_2O)_2PCH_2-CH=CH_2$ and the like. The formula $R'_{3-m}P(O)R_m$ where R', R and m are as previously defined represent phosphine oxides which are included as starting materials in the process. Typical phosphine oxides are $(C_6H_5)_2P(O)CH_2-CH=CH_2$
$(C_6H_5)_2P(O)CH=CH_2$
$(C_6H_5)(C_2H_5)P(O)CH=CH_2$
$(C_6H_5)(C_2H_5)P(O)CH_2-CH=CH_2$
$(C_4H_9)(C_6H_5)P(O)CH_2CH=CH_2$ and the like.

Phosphinates which are included as starting materials in my process are represented by the formula $(R'O)R'_{2-m}PR_m$ where R, R' and m are as previously defined and R' need not be the same throughout the same molecule. Typical phosphinates are $(C_8H_{17}O)(C_6H_5)P(O)CH_2-CH=CH_2$
$(C_6H_5)(CH_2=CH-CH_2O) P(O)CH_2-CH=CH_2$
$(C_6H_5O)P(O)(CH_2-CH=CH_2)_2$ and the like.

The phosphonates which are included as starting materials for my process can be represented by the formula $(R'O)_2P(O)R$ where R and R' are as previously defined and R' need not be the same throughout the same molecule. Illustrative phosphonates are $(CH_3CH_2ClCH_2O)_2P(O)CH_2-CH=CH_2$
$(CH_3CH_2ClCH_2O)_2P(O)CH=CH_2$
$(C_6H_5O)_2P(O)CH_2-CH=CH_2$
$(C_8H_{17}O)(C_2H_5O)P(O)CH_2-CH=CH_2$
$(C_8H_{17}O)(C_6H_5O)P(O)CH_2CH=CH_2$ and the like.

Particularly preferred phosphorus compounds for use as starting materials in my process are those wherein the olefinically unsaturated hydrocarbyl group contains from 2 to 18 carbon atoms. The nomenclature employed herein to designate phosphorus compounds is in accordance with the rules for naming compounds containing one phosphorus atom as approved by the general nomenclature committee of the Organic Division of the American Chemical Society and as published in Chemical and Engineering News, volume 30, number 43, pages 4515 through 4522, October 27, 1952. The use of "(O)" in the formulas herein designates oxygen which is bonded to only phosphorus, e.g., P=O, and no differentiation is being made herein between→ O (or semipolar linkage) and =O (or double bond linkage). In many instances the phosphonates exist in the tautomeric form as the diesters of phosphorus acid, e.g., $(R'O)_2POH$. In these instances such diesters are equivalent to the phosphonates and can be used in place of said phosphonates in my process.

The silicon compounds which are starting materials for my process include the organosilanes of the formula:

$$H_mSi(alkoxy)_{4-m-x}^{R'_x}$$

wherein R' and m are as previously and R' need not be the same throughout the same molecule. The symbol x is an integer from 0 to 3. The silicon compounds also included as starting materials in the process of this invention are polyorganosiloxanes containing the siloxane unit:

$$H_mSiO_{\frac{4-m-x}{2}}^{R'_x}$$

either recurring by itself or intercondensed with siloxane units of the formula:

$$R'_xSiO_{\frac{4-x}{2}}$$

where R, m and x are as previously defined and need not be the same throughout the same molecule. Illustrative of silicon compounds employed as starting materials are triethoxysilane, diethoxysilane, butylmonoethoxysilane, dimethylmonoethoxysilane, stearyldiethoxysilane, phenyldipropoxysilane, diethylmonobutoxysilane, methylphenylpropoxysilane, naphthyldiethoxysilane, cyclohexyldibutoxysilane and polysiloxanes which can be made by the hydrolysis and condensation of these silanes alone or in any combination. Particularly preferred silicon compound starting materials are those wherein the silicon bonded hydrocarbyl group, i.e., R', contains from 1 to 18 carbon atoms.

The products produced by my process contain at least one phosphorus atom, a least one silicon atom, and at least one divalent saturated aliphatic or cycloaliphatic hydrocarbon group, having at least two carbon atoms, interconnecting each phosphorus atom to silicon. Remaining unfilled valences of phosphorus are satisfied by no other groups than one oxo group, hydrocarbyl groups free of aliphatic unsaturation and hydrocarbyloxy groups free of aliphatic unsaturation. Each remaining unfilled valence of all silicon atoms is satisfied by no other group than hydroxy, alkoxy and hydrocarbyl groups free of aliphatic unsaturation and by no other atoms than carbon of a hydrocarbyl group free of aliphatic unsaturation and oxygen which is also bonded to no other atoms than hydrogen, silicon and carbon of an alkyl group.

Heretofore known compounds which can be prepared by my process are those of the following formulas:

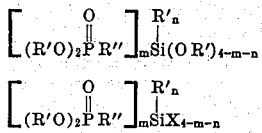

wherein R', and m are as previously defined, X is halogen, R" is a divalent saturated aliphatic or cycloaliphatic hydrocarbon group free of aliphatic unsaturation and n is an integer of 0 to 2. Other known siloxanes and silanes which can be prepared by my process are those having at least one radical selected from the group consisting of

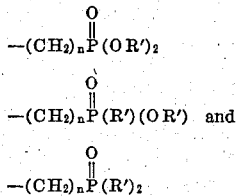

attached to silicon and all other valences of silicon being satisfied by monovalent hydrocarbon groups or siloxane linkages.

My novel compounds which are prepared by the process of this invention are the silanes having the following formulas wherein R', R" are as previously defined and R' need not be the same throughout the same molecule, R''' is a hydrocarbyl group or a hydrocarbyloxyl group, A is free of aliphatic unsaturation and need not be the same throughout the same molecule, and n is an integer of 0 to 2, m and p are each integers of 1 or 2, and the sum (n+m) is an integer of 1 to 3:

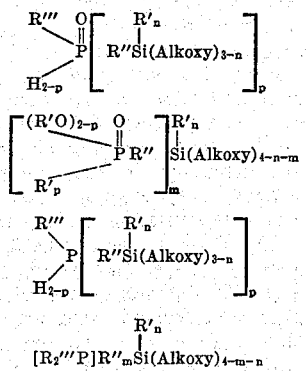

Novel polysiloxanes containing siloxane units of the following formulas, wherein R" is as previously defined, R' and R''' are as previously defined and need not be the same throughout the same molecule, n, m, (n+m) and p are as defined above and are the same throughout the same siloxane unit but need not be the same throughout the same polysiloxane molecule, and are also prepared by my process:

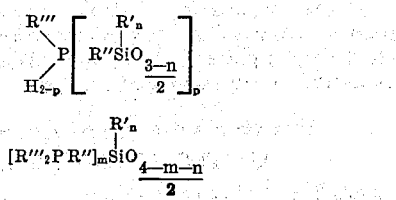

These novel polysiloxanes include polysiloxanes also containing siloxane units of the formula:

$$R'_xSiO_{\frac{4-x}{2}}$$

(R' being as previously defined and need not be the same throughout the same molecule, $x$ being an integer from 0 to 3 and need not be the same throughout the same polysiloxane molecule) as well as the novel siloxane units of the formulas shown above. These polysiloxanes are also prepared by the hydrolysis and condensation of the novel silanes described above and by the cohydrolysis and cocondensation of these novel silanes with hydrolyzable silanes having only hydrocarbyl groups and/or hydrolyzable groups, such as halogen, acyloxy and alkoxy, bonded to silicon. Hydrolysis and condensation techniques known to those skilled in the art of silicon chemistry are employed. Equilibration techniques commonly employed in the art of silicon chemistry are also used to make my novel polysiloxanes.

The polysiloxanes made by the process of this invention and those made by the hydrolysis and condensation of the phosphorus-containing silanes made by the process of this invention are useful in the form of resins for providing protective coatings to metals such as iron, steel, aluminum and the like. My polysiloxanes are also useful in the form of linears and oils as lubricants and as additives to known lubricants for improving lubricity.

The following examples are presented.

*Example I*

To a 300 cc. steel pressure vessel was added phenylethylallylphosphine, $C_6H_5(C_2H_5)PCH_2CH=CH_2$, (0.157 mole, 28.0 g.), triethoxysilane, $HSi(OC_2H_5)_3$, (0.157 mole, 25.8 g.) and di-tertiarybutyl peroxide (3.8 g.). The sealed vessel was heated slowly to 195° C. while rocking 1¾ hours. The temperature was maintained at 190° C. for 40 min. The reaction products were fractionated through "Heli-Pak" in a 12" x ¾" column. A fraction weighing 2.1 g. and having a boiling point of 90–120° C. at 0.2–0.3 mm. Hg was obtained. This fraction was analyzed and found to be ((phenylethylphosphinopropyl)triethoxysilane.

*Example II*

To one mole of

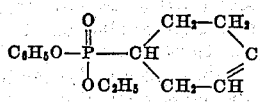

(26.7 grams) in an autoclave is added 1 mole of $HSi(OEt)_3$ (16.4 grams) and 10 wt. percent (4.3 grams) of ditertiarybutylperoxide based on the combined weights of silane and phosphorus compound. The autoclave is heated to 250° C. and held there for a period of 3 hours. The autoclave is cooled and the contents of the system separated by distillation. The unreacted $HSi(OEt)_3$ is removed and the residue whose boiling point is greater than 250° C. is analyzed. Infra-red and analytical results substantiate the structure.

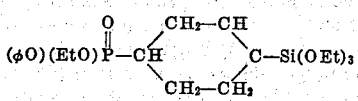

*Example III*

To one mole of $(C_6H_5(C_2H_5)PCH=CH_2$ (16.4 grams) in an autoclave there is added 1 mole of $HSi(OEt)_3$ 16.4 grams) and 10 wt. percent Ditertiarybutylperoxide (3.3 grams) based on the combined weights of silane and phosphorus compound. The autoclave is heated to 250° C. for 3 hours and then allowed to cool. Distillation of the mixture gives the desired product having the formula:

*Example IV*

To 1 mole of

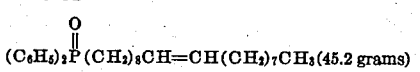

in an autoclave is added 1 mole of $HSi(OEt)_3$ (16.4 grams and 10 wt. percent Ditertiarybutylperoxide (6.2 grams) based on the combined weights of silane and phosphorus compound. The mixture is heated to 250° C., held there for 3 hours and then cooled. The unreacted HSi(OEt)₃ is removed by stripping and the residue having a boiling point greater than 250° C. is determined to be.

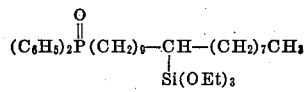

What is claimed is:

1. The process of making organosilicon compounds containing phosphorus interconnected to silicon through a group from the class consisting of aliphatic and cycloaliphatic saturated divalent groups having at least two carbon atoms, which process comprises reacting in the presence of a di-tertiaryalkylperoxide catalyst a silicon compound from the class consisting of organosilanes containing at least one hydrogen atom attached to silicon, each remaining valence of silicon being satisfied by a member of the class consisting of an alkoxy group and a hydrocarbyl group free of aliphatic unsaturation and polyorganosiloxanes containing at least one hydrogen atom attached to silicon, each remaining valence of silicon other than the valences making up the siloxane chain being satisfied by a member from the class consisting of hydroxy groups, alkoxy groups, and hydrocarbyl groups, free of aliphatic unsaturation with a phosphorus compound selected from the class consisting of trivalent phosphorus compounds containing one trivalent phosphorus atom and at least one member of the class consisting of aliphatic and cycloaliphatic olefinically unsaturated monovalent groups bonded to phosphorus each remaining valence of said trivalent phosphorus being satisfied by a member of the class consisting of hydrogen, a hydrocarbyl group free of aliphatic unsaturation and a hydrocarbyloxy group free of aliphatic unsaturation and quinquevalent phosphorus compounds containing one quinquevalent phosphorus atom, one oxo oxygen attached to phosphorus, at least one member of the class consisting of aliphatic and cycloaliphatic olefinically unsaturated monovalent groups bonded to phosphorus and at least one member of the class consisting of hydrogen and a hydrocarbyl group free of aliphatic unsaturation, the remaining valence of said quinquevalent phosphorus being satisfied by a member of the class consisting of hydrogen, a hydrocarbyl group free of aliphatic unsaturation and a hydrocarbyloxy group free of aliphatic unsaturation.

2. The process of making organosilanes containing phosphorus interconnected to silicon through a group from the class consisting of aliphatic and cycloaliphatic saturated divalent groups having at least two carbon atoms, which process comprises reacting in the presence of a ditertiaryalkyl peroxide catalyst an organosilane containing at least one hydrogen atom attached to silicon, each remaining valence of silicon being satisfied by a member of the class consisting of an alkoxy group and a hydrocarbyl group free of aliphatic unsaturation with a trivalent phosphorus compound containing one trivalent phosphorus atom and at least one member of the class consisting of aliphatic and cycloaliphatic olefinically unsaturated monovalent groups bonded to phosphorus, each remaining valence of phosphorus being satisfied by a member from the class consisting of hydrogen, a hydrocarbyl group free of aliphatic unsaturation and a hydrocarbyloxy group free of aliphatic unsaturation.

3. The process of making organosilanes containing phosphorus interconnected to silicon through a group from the class consisting of aliphatic and cycloaliphatic saturated divalent groups having at least two carbon atoms, which process comprises reacting in the presence of a di-tertiaryalkyl peroxide catalyst an organosilane containing at least one hydrogen atom attached to silicon, each remaining valence of silicon being satisfied by a member of the class consisting of an alkoxy group and a hydrocarbyl group free of aliphatic unsaturation with a pentavalent phosphorus compound containing one quinquevalent phosphorus atom, one oxo oxygen attached to phosphorus and at least one member of the class consisting of aliphatic and cycloaliphatic olefinically unsaturated monovalent groups bonded to phosphorus and at least one member of the class consisting of hydrogen and hydrocarbyl groups free of aliphatic unsaturation, the remaining valence of phosphorus being satisfied by a member from the class consisting of hydrogen, a hydrocarbyl group free of aliphatic unsaturation and a hydrocarbyloxy group free of aliphatic unsaturation.

4. The process of making polyorganosiloxanes containing phosphorus interconnected to silicon through a group from the class consisting of aliphatic and cycloaliphatic saturated divalent groups having at least two carbon atoms, which process comprises reacting in the presence of a di-tertiaryalkyl peroxide catalyst a polyorganosiloxane containing at least one hydrogen atom attached to silicon, each remaining unfilled valence of silicon other than the valences making up the siloxane chain being satisfied by a member from the class consisting of a hydroxy group, alkoxy group and hydrocarbyl group free of aliphatic unsaturation with a trivalent phosphorus compound containing one trivalent phosphorus atom and at least one member of the class consisting of aliphatic and cycloaliphatic olefinically unsaturated monovalent groups bonded to phosphorus, each remaining valence of phosphorus being satisfied by a member from the class consisting of hydrogen, a hydrocarbyl group free of aliphatic unsaturation and a hydrocarbyloxy group free of aliphatic unsaturation.

5. The process of making polyorganosiloxanes containing phosphorus interconnected to silicon through a group from the class consisting of aliphatic and cycloaliphatic saturated divalent groups having at least two carbon atoms, which process comprises reacting in the presence of a di-tertiaryalkyl peroxide catalyst a polyorganosiloxane containing at least one hydrogen atom attached to silicon each remaining unfilled valence of silicon other than the valences making up the siloxane chain being satisfied by a member from the class consisting of hydroxy groups, alkoxy groups, and hydrocarbyl groups free of aliphatic unsaturation with a pentavalent phosphorus compound containing one quinquevalent phosphorus atom, one oxo oxygen attached to phosphorus and at least one member of the class consisting of aliphatic and cycloaliphatic olefinically unsaturated monovalent groups bonded to phosphorus and at least one member of the class consisting of hydrogen and hydrocarbyl groups free of aliphatic unsaturation, the remaining valence of phosphorus being satisfied by a member from the class consisting of hydrogen, a hydrocarbyl group free of aliphatic unsaturation and a hydrocarbyloxy group free of aliphatic unsaturation.

6. The process of making (phenylethylphosphinopropyl)triethoxysilane which comprises reacting phenylethylallylphosphine with triethoxysilane in the presence of di-tertiarybutyl peroxide catalyst.

References Cited in the file of this patent

UNITED STATES PATENTS 2,823,218   Speier et al. _____ Feb. 11, 1958
2,894,968   Webster _____ July 14, 1959

UNITED STATES PATENT OFFICE
CERTIFICATION OF CORRECTION

Patent No. 2,995,594                          August 8, 1961

Frank Fekete

It is hereby certified that error appears in the above numbered patent requiring correction and that the said Letters Patent should read as corrected below.

Column 3, line 45, for "$(C_6H_5O)(C_8H_{17}O)PCO_2-CH=CH_2$" read $(C_6H_5O)(C_8H_{17}O)PCH_2-CH=CH_2$ --; column 4, line 5, for "$(CH_6H_5O)_2P(O)CH_2-CH=CH_2$" read -- $(C_6H_5O)_2P(O)CH_2-CH=CH_2$ --; column 6, lines 55 to 58, the formula should appear as shown below instead of as in the patent:

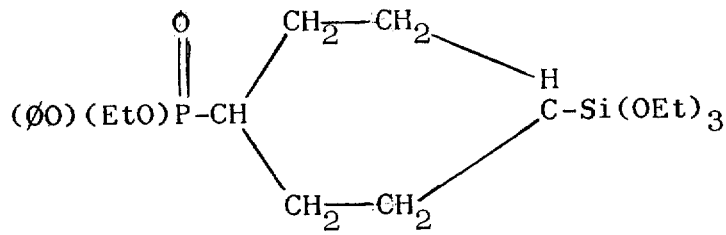

Signed and sealed this 17th day of April 1962.

(SEAL)
Attest:

ESTON G. JOHNSON                          DAVID L. LADD
Attesting Officer                        Commissioner of Patents